Patented Jan. 28, 1930

1,745,102

UNITED STATES PATENT OFFICE

JAMES M. LAMBIE AND DONALD W. ROSS, OF WASHINGTON, PENNSYLVANIA

CERAMIC MASS

No Drawing. Application filed October 16, 1924, Serial No. 744,059. Renewed November 14, 1928.

Our invention relates to the art of casting ceramic masses, particularly those used in refractories.

One object of our invention is to provide an improved method of treating ceramic masses which shall produce a casting mixture containing a minimum quantity of water.

Another object of our invention is to produce ceramic masses which shall have suitable fluidity for proper casting, but which shall have minimum tendency to crack on being fired, and which shall have a water content substantially less than the minimum water content which has heretofore been considered obtainable.

A special use of our invention is in casting refractory wares for use against molten glass, such as tank blocks, pots, glass-feeding device parts and the like.

It is well known that clay and many other ceramic materials can be made fluid with comparatively little water by the addition of deflocculating agents. Alkaline hydroxides and compounds of alkalies with weak acids, such as sodium silicate and sodium carbonate, have been used most generally for this purpose. It is also well known that various organic compounds have the property of modifying the deflocculating action of alkalies and reducing the quantity of water necessary to produce a fluid mixture suitable for casting.

We have found that sodium hydroxide is one of the most effective sodium compounds for use in deflocculating clay, although we sometimes use the other alkali compounds commonly used for this purpose, and also alkali and other basic compounds of the organic substances hereinafter mentioned. As herein used, the term basic includes both the metal alkalies and ammonium hydroxide, except where explicitly stated otherwise. Also, in cases where we use the term sodium hydroxide, it is understood that these other compounds may also be used in the same manner as sodium hydroxide, except where explicitly stated otherwise.

Wherever we use the terms "modifying substance" or "modifying agent," either in the specification or in the claims, they designate substance which, when added to casting slip in addition to basic materials, modify the result of the action of the basic materials.

In the following description of our invention we shall first discuss certain reagents which, as we have discussed, serve as deflocculating, modifying and buffering agents, followed by a description of the body materials which, as we have discovered, give satisfactory results in conjunction with these modifying agents, and then we shall describe certain discoveries which we have made as to the treatment of the materials.

We consider that the secret of gaining a water content as low as 12% lies in each of the following and in various combinations thereof:

1. The employment of the deflocculating and modifying substances (reagents) mentioned below, or combinations of the same.
2. The use of a lower plastic clay content than has heretofore been common practice.
3. The use of only certain specific types of clays.
4. Proper gradation of sizes of grog particles so as to closely approach maximum density (minimum interstitial space between grog particles).
5. Use of grog of low porosity.

Reagents

As to the reagents which we employ we have discovered:

1. That ammonium hydroxide is a desirable reagent for use in deflocculating clay.
2. That the use of ammonium hydroxide in conjunction with sodium hydroxide is more effective than is either one of them alone, and that these two substances, if used together, are much more effective in conjunction with organic modifying agents than is either of them alone with organic modifying agents. The use of one or more metal alkalies and ammonia in conjunction with certain organic substances is an important feature of our invention, and since only certain organic substances fulfill the requirements, it is necessary to enumerate many of these combinations individually.

3. That citric acid, when thus used as a modifying agent in the preparation of deflocculated ceramic masses, possesses the property of reducing to an extraordinary degree the amount of water required to produce a casting slip. By the use of citric acid in bodies that contain unusually low percentages of certain plastic clays, and grog of properly graded sizes and low porosity as described below, a slip may be produced containing not over 12% of water and sufficiently fluid for casting.

4. That certain other organic compounds, particularly formaldehyde, Rochelle salt plus oxalic acid, and gallic acid, are similar to citric acid in their effect upon the deflocculation of ceramic masses. Like citric acid, these substances when similarly used possess the property of reducing to not over 12% the amount of water required to produce a slip that is sufficiently fluid for casting.

5. That several other substances, when used in the manner herein described for citric acid, formaldehyde, Rochelle salt plus oxalic acid, and gallic acid, likewise aid in the production of fluid slips containing minimum water contents. Some of these substances which we have thus employed in the preparation of casting slips are the following: Rochelle salts, mucic acid, oxalic acid and oxalates of the alkali metals and ammonium, particularly lithium oxalate, pyrogallol, pyrocatechin and hydrochinon, hexamethylenamine and litharge.

6. That in some cases a plurality of the above mentioned substances is more effective in depressing the water content than is one alone.

7. That in certain cases where citric acid, formaldehyde, gallic acid, or one or more of the other modifying substances mentioned above is used in conjunction with ammonia and sodium hydroxide, the water content is still further depressed by addition of similar small percentages of certain oxidizing agents including hydrogen peroxide and potassium permanganate.

8. That if the ammonium hydroxide content, based upon 28% $NH_3$, is increased above 0.6%, the water content is almost as low as with smaller percentages of ammonia, and that the practical upper limit of the ammonia content is determined largely by the cost of the ammonia.

9. That if the metal alkalies, or other metallic fluxing agents soluble in water, are used in percentages of ½% or greater, enough of the alkali, or other metallic flux, collects at or near the surface of thick sections of the cast products, to cause the surface to become glazed more or less during firing.

We shall now describe, by way of example, certain specific examples showing the proportions in which we prefer to employ the various reagents mentioned above.

*Citric acid.*—In preparing casting slips with citric acid according to our invention, we may suitably employ approximately .0607% of citric acid, .0455% of sodium hydroxide and about 0.206% of ammonium hydroxide containing 28% of $NH_3$. These proportions, however, may be varied both above and below the proportions stated. In general, we find that the most effective range for the citric acid, sodium hydroxide and ammonium hydroxide may vary between one-half the figures stated and three times the figures stated. The ranges of proportions may thus be expressed in round figures as follows:

Citric acid _____ 0.03% to 0.19% of the dry mix
Sodium hydroxide _____ 0.02% to 0.14% of the dry mix
Ammonium hydroxide ____ 0.10% to 0.62% of the dry mix The percentages specifically stated above are desirable for making fluid masses with low water content. Percentages of these ingredients other than those stated above are of some value in depressing the water content, and the use of such other percentages of these ingredients is to be understood as included within our invention.

*Formaldehyde.*—In preparing casting slips with formaldehyde as the modifying agent, we may suitably employ approximately:—

.206% of ammonium hydroxide
.0455% of sodium hydroxide
.00576% of formaldehyde

The formaldehyde is added to the mixture in the form of 40% formalin solution, and in such quantity as to give the stated percentages of formaldehyde. It is to be understood that these proportions may be varied both above and below the proportions stated, in the same manner as when citric acid is employed, and the use of such other percentages of these ingredients is to be understood as included within our invention.

*Gallic acid.*—In preparing casting slips with gallic acid as the modifying agent, we may suitably employ approximately .206% of ammonium hydroxide
.0455% of sodium hydroxide
.03035% of gallic acid It is to be understood, however, that these proportions may be varied both above and below the proportions stated, in the same manner as when citric acid is employed, and the use of such percentages of these ingredients is to be understood as included within our invention.

The use of sodium hydroxide and gallic acid in casting slips is not new. Casting slips sufficiently fluid for casting have heretofore been made with as low as 15% of water. We have found that by the use of ammonium hydroxide in connection with sodium hydroxide and gallic acid the water content of a slip sufficiently fluid to be cast may be lowered to 12% of water at the most. We believe this combination is novel and has not been used heretofore.

*Alternative reagents.*—In preparing casting slips with some of the other substances mentioned above according to this part of our invention, we may suitably employ approximately the following percentages:

| | Per cent |
|---|---|
| Ammonium hydroxide | .206 |
| Sodium hydroxide | .02 |
| Rochelle salts | .03 |

| | |
|---|---|
| Ammonium hydroxide | .21 |
| Sodium hydroxide | .04 |
| Mucic acid | .06 |

| | |
|---|---|
| Ammonium hydroxide | .21 |
| Sodium hydroxide | .04 |
| Oxalic acid | .06 |

| | |
|---|---|
| Ammonium hydroxide | .21 |
| Sodium hydroxide | .04 |
| Pyrogallol | .01 |

| | |
|---|---|
| Ammonium hydroxide | .21 |
| Sodium hydroxide | .04 |
| Hydrochinon | .03 |

| | |
|---|---|
| Ammonium hydroxide | .21 |
| Sodium hydroxide | .04 |
| Pyrocatechin | .03 |

It is to be understood, however, that these proportions may be varied both above and below the proportions stated, in the same manner (from one-half to three times the figures given) as when citric acid is used as the modifying agent, and the use of such other percentages of these ingredients is to be understood as included within our invention.

*Plural reagents.*—In preparing casting slips by the use of a plurality of modifying reagents we may suitably employ approximately the following percentages:

| | Per cent |
|---|---|
| Ammonium hydroxide | .21 |
| Sodium hydroxide | .04 |
| Citric acid | .06 |
| Lithium oxalate | .03 |

| | |
|---|---|
| Ammonium hydroxide | .21 |
| Sodium hydroxide | .04 |
| Citric acid | .03 |
| Formaldehyde | .01 |

| | |
|---|---|
| Ammonium hydroxide | .21 |
| Sodium hydroxide | .04 |
| Citric Acid | .06 |
| Rochelle salts | .02 |

| | |
|---|---|
| Ammonium hydroxide | .21 |
| Sodium hydroxide | .04 |
| Oxalic acid | .01 |
| Formaldehyde | .01 |

| | |
|---|---|
| Ammonium hydroxide | .21 |
| Sodium hydroxide | .04 |
| Citric acid | .06 |
| Pyrocatechin | .02 |

| | |
|---|---|
| Ammonium hydroxide | .21 |
| Sodium hydroxide | .03 |
| Oxalic acid | .03 |
| Rochelle salts | .03 |

| | |
|---|---|
| Ammonium hydroxide | .21 |
| Sodium hydroxide | .04 |
| Mucic acid | .06 |
| Formaldehyde | .01 |

| | |
|---|---|
| Ammonium hydroxide | .21 |
| Sodium hydroxide | .04 |
| Citric acid | .06 |
| Oxalic acid | .03 |

It is to be understood, however, that these proportions may be varied both above and below the proportions stated, as in all of the other examples given above, and the use of such other percentages of these ingredients is to be understood as included within our invention.

The above combinations are merely examples and many other combinations may be prepared that will give equally satisfactory results.

We have found the mixture of ammonium hydroxide, sodium hydroxide, oxalic acid and Rochelle salts to be especially valuable in preparing our casting slips. It is about as effective in reducing the water content of the slip as the citric acid reagents mentioned above.

*Modifying agents plus oxidizing agents.*—In preparing casting slips using oxidizing agents in addition to the modifying reagents, we may suitably employ approximately the following percentages, as for example:

| | |
|---|---|
| Ammonium hydroxide | .21% |
| Sodium hydroxide | .04% |
| Citric acid | .06% |
| Hydrogen peroxide | .01% of 3% solution |

| | |
|---|---|
| Ammonium hydroxide | .21% |
| Sodium hydroxide | .04% |
| Citric acid | .06% |
| Potassium permanganate | .02% |

| | |
|---|---|
| Ammonium hydroxide | .29% |
| Sodium hydroxide | .02% |
| Rochelle salts | .09% |
| Hydrogen peroxide | .06% |

It is to be understood that these proportions may be varied both above and below the proportions stated, as in all of the examples given above, and the use of such other percentages of these ingredients is to be understood as included within our invention.

In the examples given above of combinations for treating ceramic masses, which shall produce a mixture containing a minimum quantity of water, we have used sodium hydroxide as the type substance for deflocculation. However, it is to be understood that the other basic compounds of metals that are commonly used for deflocculating clay slips may also be used. Compounds such as those that would normally form between the basic compounds of metals and the organic modifying agents mentioned herein may be used in place of at least part of the basic compounds of metals. Likewise, compounds such as those that would normally form between ammonium hydroxide and the organic modifying agents mentioned herein may be used in place of at least part of the ammonium hydroxide. As for instance hexamethylenamine formed by combination of formaldehyde with ammonia can be used in place of part of the ammonia. This use of hexamethylenamine with ammonia, are formaldehyde with an excess of ammonia, is not new but we believe that the use of such a combination in conjunction with sodium hydroxide or other basic compounds of a metal is novel and has not been used heretofore. The use of these substances, other than sodium hydroxide and ammonium hydroxide, is also to be understood as included within our invention.

The deflocculation-modifying substances, such as citric acid, gallaic acid, formaldehyde, Rochelle salts, mucic acid, oxalic acid, the alkali-metal and ammonium oxalates, pyrogallol, pyrocatechin, hydrochinon, hexamethylenamine, and litharge, have polar molecules which collect at interfaces, such as between clay and water, and alter the energy content of the particles surrounded by such interfaces. These substances, when in water solution, act as polarized molecules, and enter the interfaces and alter the electrical charge on the particles and therefore the degree of deflocculation between these particles.

By a "polar" molecule we mean one in which one end or portion of the molecule is chemically different than the balance of the molecule, i. e. is of such a character that the molecule is adsorbed in an oriented position on the surface of a clay particle.

We do not wish to limit ourselves to any theory as to the manner in which our modifying reagents produce their effect on ceramic masses. However, most of such materials that we have used are substances normally capable of combining with sodium hydroxide, and many of them are frequently used as reducing agents or are at least readily oxidized. It is probable that, at least, some of these substances act in a measure as means for nullifying the effects on the slip of soluble chlorides, sulphates and lime compounds, etc., which may be present in the clay or water with which the slip is made. Formaldehyde, pyrocatechin, and other like reagents are used in a similar way in the production of colloidal gold. We believe that many of these substances act as "buffers", to maintain the pH (hydrogen ion concentration) of the slip in the most desirable range for casting. See "The Determination of Hydrogen Ions" by W. M. Clark.

Different clays are deflocculated at different pH, depending upon the amounts of adsorbed bases these clays contain. Hence all casting bodies may not have the same pH at their optimum condition for casting, and therefore it is advantageous to use such clays in any given slip as will be deflocculated at or near the same pH or that when mixed together shall have a pH such that both will be at or near maximum defloccualtion. However, we have found that for the slips which we use and which contain certain of the Kentucky and Tennessee clays, the slip has maximum fluidity at approximately pH9 to pH10. In our usage the term "adsorbed" indicates that substances adsorbed by clays are held on the surfaces of the clay particles either by some physical force or by chemical reaction between the surface of the clay grains and the material adsorbed.

The reduction of the water content of casting slip made possible by our present invention is accompanied by many advantages, among which may be mentioned the shortening of the time necessary for drying the cast articles preparatory to firing; decreasing the care necessary in drying; the reduction of the shrinkage of the clay during drying and firing; the production of a stronger product, and the casting of much thicker sections than has been common practice heretofore.

The use of ammonium hydroxide as a deflocculating agent has the special advantage that it does not decrease the refractoriness of the finished product, even when used in relatively large percentages, because the ammonium hydroxide disappears entirely from the material during the drying and firing operations.

*Body materials.*—For the plastic clay content we have found that from ten to twenty-five per cent of commercial plastic clay, such as "ball" and other clays that respond satisfactorily, are most satisfactory for our purpose, instead of the usual amounts of from forty to fifty percent of plastic clay that have been hertofore used in common practice.

Although we use a low content of plastic clay for this purpose, we are able to use much more than is the absolute minimum neressary for bonding the grog together. It has been our experience that unless we are able to get the water content of any casting slip below 15%, we are not able to successfully cast thick sections.

Above we have used the term "commercial plastic clay," but it must be understood that in all or practically all clays there is inert material that takes no part, or at least very little part, in bonding the mix together, or in taking up the free salts that are always present. The percentages of clays that we find desirable to use in our mixes therefore depend largely on the percentages of active bonding materials present in these clays. If a commercial clay is used, all of whose material is active in bonding the mix together, or if such a bonding material is artificially prepared, it is possible that somewhat lower percentages of such bonding materials can be used than those given above for "commercial plastic clay." As little as 5% of pure bonding material is sufficient for bonding, if the grog and other non-plastic ingredients are properly graded to produce a minimum volume of voids between the inert particles. Our invention is to be understood as including the use of such materials in their desired percentages.

As explained above, we are able to lower the water content of casting slips by the use of small additions of several substances and also by the use of unusually low percentages of plastic clay. In addition to these, we have discovered that by the use of certain clays in the mixes, we are enabled to obtain a fluid slip which has a much lower water content than is possible by the use of other clays. The clays that serve our purpose particularly well are of the ball clay type, such as are found in Western Kentucky and Tennessee, Southern Illinois and Southern Missouri districts.

The behavior of these certain clays may be due to their contents of organic materials, such as "humic acid"; to their contents of adsorbed bases; to the physical condition these clays are in; or to the absence of materials which tend to offset the action of the deflocculating materials, such as soluble chlorides, sulphates and free calcium compounds.

Many of the clays which we find suitable for our purpose are extremely refractory and burn dense at lower temperatures than do most refractory fire clays, but except as these suitable clays contain inert material such as sand, they have extremely high burning shrinkage and for this reason they have not proven very satisfactory in refractory mixes made up by the ordinary present day plastic clay methods. In casting slips, they readily disseminate among the grog particles and when used in conjunction with the special features of our process are entirely satisfactory. They tend to decrease the fired porosity of wares in which they are used. When used in refractory ware they increase the refractoriness of the ware.

As stated above, these clays are extremely refractory and yet possess the peculiar property of burning dense at relatively very low temperatures and, accompanying this partial vitrification at low temperatures, mullite development proceeds in them relatively rapidly, as compared to the flint and other fire clays which have equal refractoriness. Refractory wares in which the open-burning refractory flint and other fire clays of equal refractoriness are used as grog are very porous and are subject to considerable shrinkage in use even though the wares have been fired to cones ten to fourteen. We have discovered that since these clays of the ball clay type acquire maximum density as they do with relatively very moderate heat treatments, they are, when so burned, particularly useful as grog for refractory wares; because wares in which they are used as grog have much less firing shrinkage and retain much less residual shrinkage after firing than do similar wares in which the ordinary open-burning fire clays of equal refractoriness are used as grog. They have, thus, the double advantage that they can be burned dense by a relatively very moderate heat treatment and that in this dense condition they are particularly useful as grog for refractory wares.

As described elsewhere herein, we are able by our casting methods to use larger total percentages of grog than appear possible by the plastic clay method of molding wares. By using such large percentages of this dense grog, we are able to reduce burning and residual shrinkage to a minimum not heretofore obtained in usual commercial practice. We prefer to use as much of this low porosity grog as commercial conditions permit.

We have found that grog which consists of the proper proportions of the various sized particles, graded down from the maximum size which we use, so that the smaller particles fit in the spaces between the larger ones to such an extent as to result in a grog, the particles of which can be so arranged as to closely approximate "maximum density," and hence when so arranged contain a minimum amount of interstitial space, requires a minimum amount of water to float the grog and a minimum amount of plastic clay to fill the interstices between the grog. Since the interstices in such cast clay grog mixes as are ordinarily made are of considerably greater volume than are those at "maximum density," it is almost universally true that less clay is required in a properly bonded body the nearer the grog gradation of sizes approaches that of "maximum density." The further result of this is to depress the required water content of the body, with the additional result that the porosity of dry ware, and hence also of fired ware, made from such a mix is lower than if the grog were not so graded.

We have further found that to cast ware having thick sections, which will be sound and otherwise satisfactory after having been fired, the manufacturing operations, particularly the firing are very much simplified, if the bodies from which the wares are made shrink but little on being fired.

Fire clay grog made from such materials as ball clay that withstands cone 32 or higher without fusing and which has been fired to the point at which its porosity is not over three percent, and in which the formation of $3Al_2O_3.2SiO_2$ (mullite) is well started, does not shrink much on being refired. Hence when such material is used as properly graded grog in casting bodies as herein described, its further contraction causes only a very small part of the firing shrinkage of the ware when the latter is fired.

Such non-shrinking grog, finely ground and used as the fines of a grog properly graded in sizes so as to approach "maximum density," greatly aids in elimination of fine cracks through the plastic and around the grog particles of the fired ware. That is, it aids towards continuousness in the interior of the ware.

The use of such low-porosity grog as herein described has the further advantages that since water is taken up within the grog in proportion to the porosity of the grog, casting slips made with non-porous grog or grog of low porosity and of a given gradation of sizes, require less water to make them fluid enough to flow than do similar mixes containing similar gradations of more porous grog, and ware made from such slips have low porosity in the dry state and hence also in the fired state.

In the case of ten-mesh grog, ground on the usual form of dry pan, we find that we approach "maximum density" of grog if approximately forty-four per cent of the product passes through a hundred mesh Tyler standard screen and a majority of the one-hundred-mesh material passes through a two-hundred-mesh screen, and that this gradation of sizes works particularly well in casting mixes.

Other dense refractory materials of equally low porosity such as $3Al_2O_3 2SiO_2$ (mullite formerly thought to be sillimanite) alumina, $Al_2O_3$ (corundum or fused alumina, etc.), cyanite and andalusite, etc., properly graded as to size, can in some cases be used in a manner similar to that described above for dense fired clay grog.

In cases where extreme refractoriness is not essential, we have found that "vitrified" white ware bisque (under 5% porosity) makes a very desirable grog of low porosity and consequent low shrinkage.

The mineral cyanite, when finely divided and used as part of the grog in a casting slip, aids in maintaining a continuous structure within the body of wares cast from it, and decreases the burning shrinkage, thereby decreasing the tendency of the ware to crack in burning. This feature is particularly advantageous in the manufacture of large wares such as flux blocks for use against molten glass. The use of cyanite in refractories is described and claimed in our copending application for Letters Patent filed February 1, 1924, Serial No. 690,042.

We have found that by the use of the above described reagents in conjunction with the low percentage (25% or less) of the certain commercial plastic clays, or clay-like materials, that respond satisfactorily for our purpose, and refractory grog of low porosity, suitable chemical composition and properly graded as to size so as to closely approach "maximum density", we are able to produce slips that are sufficiently fluid for casting purposes, and which are much lower in water content than are ordinary casting slips. Low water content slips such as have just been described have the following advantages:

1. That in the dry state ware made of such a mix has an unusually low porosity. This is very desirable as it aids in obtaining a low porosity of fired ware. This low porosity of ware in the dry state tends to greatly increase the strength of the ware. This fact is of great importance especially in the case of large-size ware such as large "flux blocks".

In the case of "flux blocks" and other refractories for use against molten glass, low porosity of the fired ware is particularly desirable in that low porosity of the ware increases the resistance of the ware to glass action. In the case of such "flux blocks" it is very difficult by the methods now in common use to produce blocks whose porosity in the fired state is low enough to be satisfactory, since a large percentage of the grog put into the average flux blocks is made from old flux blocks which were themselves very porous.

Large and ever increasing tonnages of "flux blocks" are used annually, and as far as we are aware our above described casting body composition with its attendant variations, is the only means whereby "flux blocks" of satisfactorily low porosity can be manufactured, without sacrificing to an undesirable extent other properties of the blocks such as refractoriness, resistance to spalling, etc.

2. That since the mix has a relatively very low water content, were made from such a mix will dry in a comparatively short time, and much more safely than does ware made by the present method of molding wares of plastic clay. In the case of such wares as "flux blocks", particularly large-size flux blocks, this is of special advantage, in that, although rather extensive mechanical apparatus is needed to properly dry flux blocks as they are commonly made at present, flux blocks of similar and larger sizes made by our process dry satisfactorily without any precautions being taken to provide especially suitable or constant drying conditions.

3. That such a mix has a very low drying shrinkage. For this reason we are able to cast ware of any size and thickness. The size of flux blocks that can be successfully made by the present plastic clay method is decidedly limited by drying shrinkage difficulties; whereas the sizes that can be made by our process are limited only by what can be used and moved in transit to their position in the glass factory. In much of the present day casting, the thickness of satisfactory pieces which can be cast is limited by the high water content and resulting large drying shrinkage.

4. That with such small drying shrinkage and low dry porosity, the burning shrinkage and hence the total shrinkage is low. This, with a suitable mold, enables us to cast blocks and other large ware which will be substantially "to dimension" when burned, with a minimum of grinding of the dry or burned pieces.

5. That flux blocks made in this way are heavier per unit volume of fired ware than are the flux blocks that are commonly made today. Hence, they resist glass action better. On account of the extremely refractory nature of the clay that is disseminated between the grog particles, flux blocks made by our process are considerably more refractory than are average present day flux blocks.

By the term "flux blocks" we mean those various shapes which are used in contact with glass or slags and which are subjected to the fluxing action of glass or its constituents during the use of the blocks.

*Treatment of materials.*—That part of our present application which relates to the treatment of the materials employed is based upon the following additional discoveries:

1. That by using hot water in preparing the slip
   (*a*) We are in certain cases able to depress the water content of the slip further than if cold water is used.
   (*b*) On mixing, the clay and water form a fluid slip more readily than if cold water is used.
   (*c*) The poured article dries more rapidly than if cold water is used.

In this connection it should be noted that rapid drying is aided by the fact that the interior of the mass is at an elevated temperature, in addition to the fact that the higher the temperature of water, the lower its viscosity and the more readily it evaporates.

2. That when we use a slip that is so thick that it will not readily flow and fill the corners of a rectangular mold, we can, by vibrating the mold, cause the slip to fill the corners satisfactorily. In this way we have been able to use a slip containing as little as approximately 11.5% of water. We also find that we can use still stiffer masses by the use of pressure to make them conform to the shape of the mold.

In cases where water content as high as 12% is permissible in the slip, the slip is usually so fluid that it is not necessary to resort to these devices.

Wherever percentages of ingredients are expressed, either in the specification or in the claims, they are percentages by weight of the dry mix, unless otherwise stated.

Several of the organic substances we have enumerated may be termed organic bases. The metallic element of many of the inorganic, or metal organic substances enumerated fall into what may be termed the alkali-metal group of elements. The metallic element of still other inorganic, or metal organic, substances fall into what may be termed the alkali-earth group of elements.

Of course all compounds of all these basic materials probably do not work equally well. This is probably due in part to the nature of the non-alkaline portions of the compounds, and in part to the alkaline portions themselves.

Thus there are inherent differences in the individual alkali-metal and alkaline-earth groups of elements. According to the general principles set down in text books of chemistry, the basic materials that serve our purpose best are apparently those that are most truly basic. As an example of basicity the hydroxide of sodium is probably most characteristic.

Thus although the various individual members show their own characteristic properties, it appears permissible for our purpose to class organic bases, metal alkalies, and alkaline-earth compounds, as one group, of basic substances.

This concept is apparently not at variance with that given elsewhere herein for polar molecules.

The terms "base" and "basic" as used in both the specification and claims refer to ammonium hydroxide, organic basic reacting materials and basic metal compounds as well as to the alkali metal bases.

Where reference is made in the appended claims to alkalies and to citric acid, gallic acid and other substances, we wish to be understood as referring to these substances as added to the ceramic masses, irrespective of whether or not they combine therein to produce citrates or other compounds. Also, as to the term "disperse systems" hereinafter employed, ceramic casting slips come within such definition, and the acids and salts of acids enumerated herein as aids to casting fall within the general class of hydroxyl compounds of an acid character, having at least two hydroxyl groups adjacent.

In the foregoing specification the proportions of various materials are mentioned when they are pertinent to this invention. As to ingredients of ceramic masses which are not specifically mentioned, or as to which no proportions are stated, it will be understood that such materials and proportions are to be employed according to usual practices.

The novel steps of our casting process are described and claimed in our co-pending application for Letters Patent filed December 22, 1924, Serial No. 757,422. The present application is concerned with the ceramic compositions which we employ and it is to be understood that our invention is not restricted to the preparation of clay slips but may also be employed in making other ceramic masses. It will also be understood that no other limitations are to be imposed on our invention except such as are indicated in the appended claims.

We claim as our invention:

1. A ceramic casting slip containing ammonium hydroxide and sodium hydroxide.

2. A ceramic casting slip containing ammonium hydroxide and sodium hydroxide, and also containing Rochelle salt plus oxalic acid.

3. A ceramic casting slip containing the following materials, in approximately the proportions stated,

| | |
|---|---|
| Ammonium hydroxide | 0.10% to 0.62% of the dry mix |
| Sodium hydroxide | 0.01% to 0.14% of the dry mix |
| Rochelle salts | 0.01% to 0.10% of the dry mix |
| Oxalic acid | 0.01% to 0.10% of the dry mix |

4. A ceramic casting slip containing the following materials in approximately the proportions stated:

| | |
|---|---|
| Ammonium hydroxide | 0.10% to 0.62% of the dry mix |
| Sodium hydroxide | 0.010% to 0.14% of the dry mix |
| Rochelle salts | 0.010% to 0.10% of the dry mix |
| Oxalic acid | 0.010% to 0.10% of the dry mix |
| Litharge | 0.010% to 0.10% of the dry mix |

5. A ceramic casting slip containing ammonium radical and a basic compound of a metal.

6. A ceramic casting slip containing ammonium radical and a basic compound of a metal, and also containing Rochelle salts and oxalic acid.

7. A ceramic casting slip containing not materially less than .10% of ammonium hydroxide and not materially less than .02% of sodium hydroxide.

8. A ceramic casting slip containing ammonium radical, a basic compound of a metal, deflocculatable clay, and orangic matter such as that which naturally occurs in clay.

9. A ceramic casting slip containing 0.10% to 2.0% of ammonium hydroxide and 0.02 to 0.2% of sodium hydroxide, deflocculatable clay, and organic matter such as that which naturally occurs in clay.

10. A ceramic casting slip containing ammonium hydroxide, sodium hydroxide, Rochelle salt, oxalic acid and litharge.

11. A ceramic casting slip containing ammonium radical and another basic substance, deflocculatable clay, organic matter such as that which naturally occurs in clay, together with another organic substance consisting of a highly oxygenated polyhydroxyl compound.

12. A ceramic casting slip containing ammonium radical and a basic compound of a metal, and also containing at least one of the group of substances comprising oxalic acid, citric acid, gallic acid, mucic acid, pyrocatechin, hydrochinon and pyrogallol.

13. A ceramic casting slip containing ammonium radical and a basic compound of a metal, and containing at least one of the group of substances comprising oxalic acid, citric acid, gallic acid, mucic acid, pyrocatechin, hydrochinon and pyrogallol, and also containing an oxidizing agent.

14. A ceramic casting slip containing ammonium radical, a basic compound of a metal, deflocculatable clay, organic matter such as that which naturally occurs in clay, and graded grog.

15. A ceramic casting slip containing ammonium radical, a basic compound of a metal, deflocculatable clay, organic matter such as that which naturally occurs in clay, and grog grains, a portion of which are graded to obtain maximum density of piling and wherein 37% to 55% of the grog by weight has a diameter less than one-tenth the average diameter of the coarsest 5% of the grog.

16. A disperse system having a small amount of dispersion medium, containing free ammonium hydroxide, organic matter such as that which naturally occurs in clay, another basic substance and an organic polyhydroxyl compound of an acid character, having at least two hydroxyl groups adjacent.

In testimony whereof we the said JAMES M. LAMBIE and DONALD W. ROSS, have hereunto set our hands.

JAMES M. LAMBIE.
DONALD W. ROSS.